(12) United States Patent
Soga

(10) Patent No.: US 6,199,957 B1
(45) Date of Patent: Mar. 13, 2001

(54) DEVICE FOR CONTROLLING BRAKE SYSTEM OF VEHICLE WITH CARE FOR BATTERY

(75) Inventor: Masayuki Soga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/440,588

(22) Filed: Nov. 15, 1999

(30) Foreign Application Priority Data

Dec. 21, 1998 (JP) .................................................. 10-362911

(51) Int. Cl.[7] ................................ B60T 8/00; B60T 8/88; B60T 17/18
(52) U.S. Cl. ......................... 303/3; 303/122.05; 303/155; 303/191; 303/116.1; 303/20
(58) Field of Search .................................. 303/3, 155, 20, 303/122.05, 191, 15, 122.04, 10–11, 113.4, 116.1; 307/10.1, 10.7; 701/70, 76

(56) References Cited

U.S. PATENT DOCUMENTS 4,524,311 * 6/1985 Yokota et al. .
4,722,576 * 2/1988 Matsuda .
5,129,713 * 7/1992 Matsuda .

FOREIGN PATENT DOCUMENTS 7-17375    1/1995  (JP) .
10-100884  4/1998  (JP) .

\* cited by examiner

*Primary Examiner*—Douglas C. Butler
(74) *Attorney, Agent, or Firm*—Oliff & Berridge, PLC

(57) ABSTRACT

A device for controlling an electro-hydraulic brake system of a vehicle checks if the battery or the alternator forming an electric power source for the electric part of the brake system is in its normal operating condition, and when the battery or the alternator is not in its normal operating condition, lowers the load imposed on the battery, so as to care the battery against a too soon failure. The device may also check if the driver is pumping the brake pedal at a substantial standstill of the vehicle, and when the brake pedal is so pumped, also lowers the load imposed on the battery, so as to care the battery against a useless consumption of the battery.

8 Claims, 5 Drawing Sheets

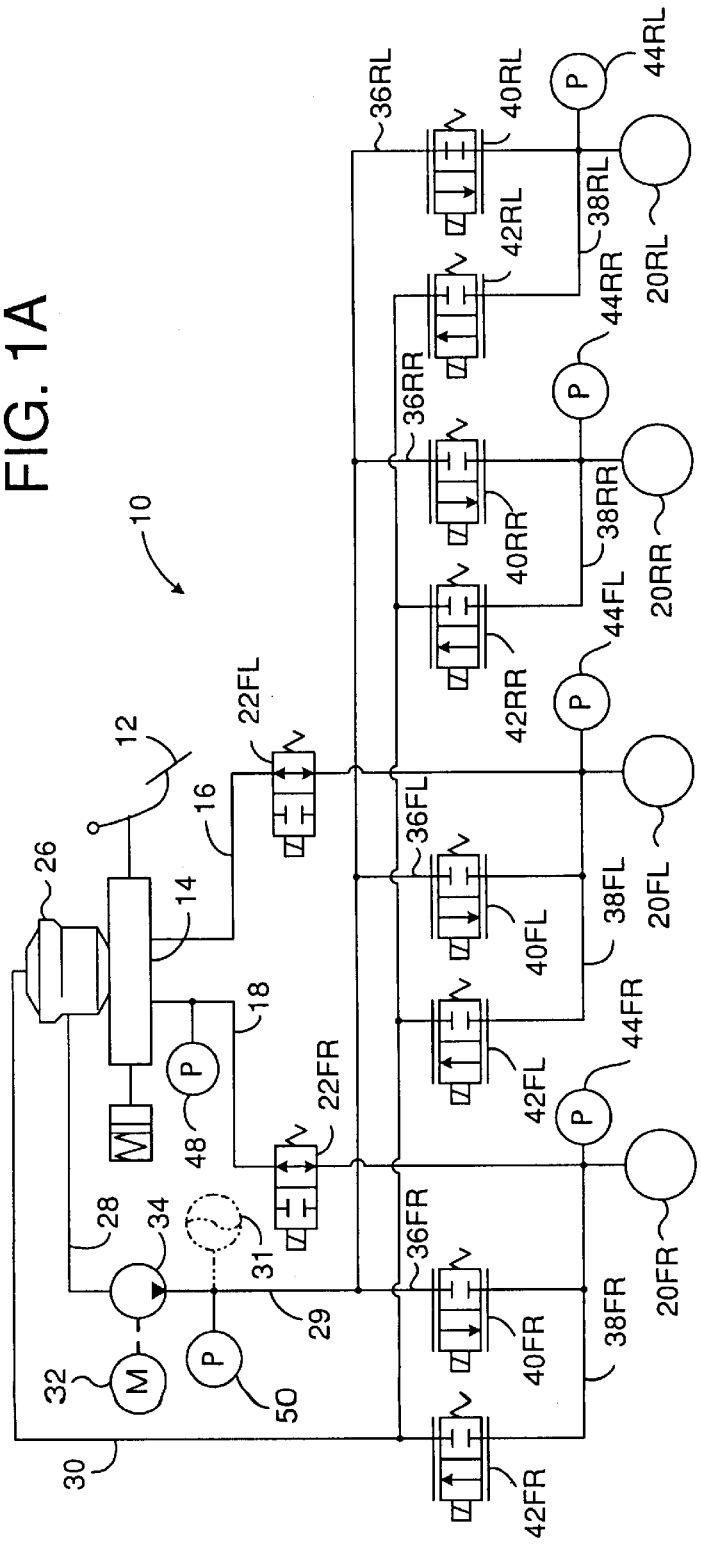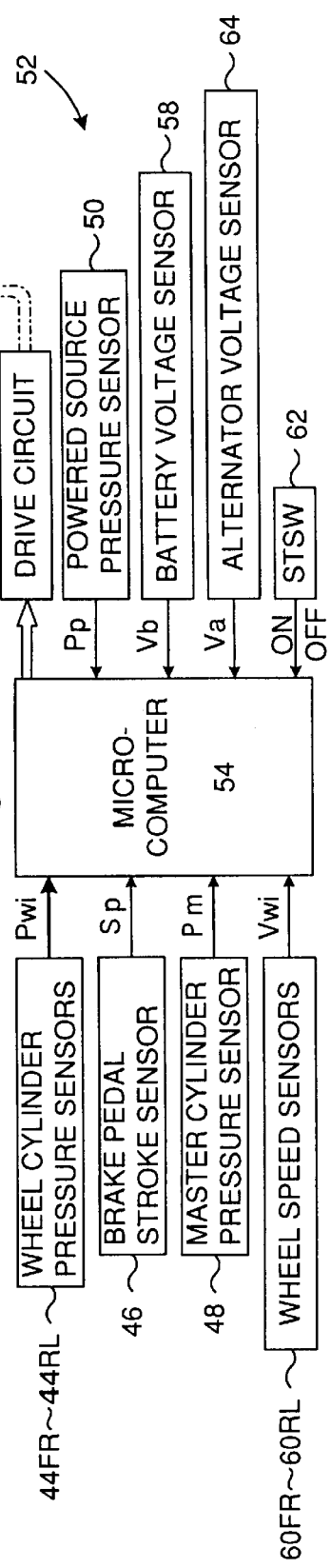

DEVICE FOR CONTROLLING BRAKE SYSTEM OF VEHICLE WITH CARE FOR BATTERY

BACKGROUND OF THE INVENTION

1. Field of the Invention

The present invention relates to a device for controlling an electric or electro-hydraulic brake system of a vehicle such as an automobile with care for a battery forming an electric power source for the electric or electro-hydraulic brake system.

2. Description of the Prior Art

Not only in an electric brake system of a vehicle in which a braking force is directly generated from an electric current supplied from a battery of the vehicle but also in an electro-hydraulic brake system of a vehicle recently developed in a high variety as described in, for example, U.S. patent application Ser. No. 09/263,226 by the same assignee as the present application, in which a pump is driven by a battery of the vehicle to provide a pressurized brake fluid source, so that wheel cylinders of wheels are selectively supplied with the pressurized brake fluid from the source under a control of solenoid-actuated on-off valves, it is essential that the battery is operating at its normal condition.

In Japanese Patent Laid-open Publication 7-17375, it is described that in a brake system in which a brake oil pressure is normally controlled by a solenoid control valve according to a duty ratio of a control current supplied from a battery, when a lowering of the output voltage of the battery is detected by a voltage sensor, the duty ratio control is stopped, while the control valve is maintained at a constant position.

It is not correctly checked if a battery is in a normally operating condition or not when no substantial load is imposed on the battery. Therefore, it is considered to check the battery during an operation of the brake system, such that, for example, the output voltage thereof is detected by a sensor when the brake pedal is depressed beyond a predetermined depth. However, those modern electro-hydraulic brake systems under the recent high variety developments are mostly adapted to execute various automatic behavior controls such as anti-spin controls, anti-driftout controls, anti-overroll controls, etc. depending upon separate applications of a controlled braking to each of the generally four wheels, and therefore, the operation of the brake system is an integration of a driver's braking intention and a control calculation of an automatic behavior controller constructed by an electronic computer. Therefore, in those modern electro-hydraulic brake systems it is very difficult to check the battery operating condition under its prescribed loading condition.

In view of such a difficulty, the present inventor has proposed in a co-pending application No. 09/440,587 filed Nov. 15, 1999 a device for controlling an electro-hydraulic brake system of a vehicle incorporating a particular system for correctly checking the operating condition of the battery of the vehicle.

SUMMARY OF THE INVENTION

The inventor now turns his contemplation on a concept how the battery can be cared when the output voltage of the battery has lowered as detected by an appropriate device such as proposed by the above-mentioned separate application, or when it is anticipated that the battery will lose its normal operating condition in the near future, because an alternator for charging the battery is not normally operating, or further when the vehicles are driven by some drivers who have a habit of pumping the brake pedal when the vehicle is at a substantial standstill, thereby uselessly consuming the electric power of the battery.

In the electro-hydraulic brake system in which the brake fluid supplied to the wheel cylinders is pressurized by a pump driven by a motor energized by the battery of the vehicle, and is selectively supplied to a selected one or more of the wheel cylinders as controlled by electrically operated on-off valves such as solenoid valves energized by the battery according to depressions of the brake pedal by the driver, a substantial amount of electric power is consumed each time when an adjustment of the braking force is made, as the electrically energized on-off valve or valves must be changed over in the manner of reciprocation. When the adjustment of the braking force is to increase it, of course a further electric energy is consumed to pressurize the brake fluid to be supplied for increasing the braking force.

Particularly when the driver has a habit of pumping the brake pedal at a standstill of the vehicle, a substantial electric power of the battery is uselessly consumed, or in other words, herein there exists a good chance of caring the battery against losing its normal operating condition, or the life, if such a useless consumption of the battery is avoided.

Therefore, it is a primary object of the present invention to provide a device for controlling an electro-hydraulic brake system of a vehicle such as an automobile in such a construction that a care is provided for its battery when it suffers a trouble such as a lowering of the output voltage thereof, or when it is anticipated that such a trouble will occur in the near future, or further when a saving of a useless consumption of the electric power of the battery is possible.

According to the present invention, the above-mentioned primary object is first accomplished by a device for controlling an electro-hydraulic brake system of a vehicle having wheels, a battery, an alternator for charging the battery, and the electro-hydraulic brake system adapted to be energized by the battery and including wheel cylinders, a brake pedal, electric control means, a pump adapted to operate under a control of the electric control means for pressurizing a brake fluid, and on-off valves adapted to operate under a control of the electric control means for selectively supplying the brake fluid pressurized by the pump to each of the wheel cylinders, the device comprising:

means for detecting if the battery is normally operating;

wherein the electric control means control the operation of the pump and the on-off valves such that the pressure of the brake fluid supplied to the wheel cylinders is restricted not to be higher than a first predetermined value lower than a standard output voltage of the battery when the battery detection means detect that the battery is not normally operating.

By the device of the above-mentioned construction, the electro-hydraulic brake system of a vehicle is controlled such that it operates at such lowered pressure values which do not exceed the first medium pressure value when at least it is detected that the battery is not normally operating, so that the battery is cared for its suffering, so as to be able to operate a longer until it is repaired or replaced by a new one.

The device according to the present invention may further comprise means for detecting if the alternator is normally operating, and the electric control means may control the operation of the pump and the on-off valves such that the pressure of the brake fluid supplied to the wheel cylinders is restricted not to be higher than a second predetermined medium pressure value when the alternator detection means detect that the alternator is not normally operating. By such an arrangement, the battery is cared against failing due to a failure of the alternator.

The device according to the present invention may further comprising means for detecting if the vehicle is substantially at a standstill, and means for detecting if the brake pedal is pumped by a driver, and the electric control means may control the operation of the pump and the on-off valves such that the pressure of the brake fluid supplied to the wheel cylinders is restricted not to be higher than a third predetermined medium pressure value when the brake pedal is pumped at a substantial standstill of the vehicle. By such an arrangement, the battery is further cared against a useless consumption by the habit of pumping the brake pedal at a substantial standstill of the vehicles of some drivers.

Since drivers will not do such a pumping of the brake pedal under a condition that a strong braking is required to hold the vehicle, it will be appreciated that the pressure level of the above-mentioned third predetermined medium pressure value may be further lowered from the above-mentioned first or second predetermined medium pressure value.

When the brake system comprises an accumulator for the brake fluid pressurized by the pump, the electric control means may control the operation of the pump such that the pressure of the brake fluid supplied to the wheel cylinders is restricted not to be higher than the first or second predetermined medium pressure value by lowering the pressure of charging the accumulator when the battery detection means detect that the battery is not normally operating, or when the alternator detection means detect that the alternator is not normally operating.

BRIEF DESCRIPTION OF THE DRAWINGS

In the accompanying drawings,

FIG. 1A is a diagrammatical illustration of an example of a hydraulic circuit of an electro-hydraulic brake system in which the brake control device according to present invention is incorporated;

FIG. 1B is a diagrammatical illustration of an embodiment of the electric control means forming an essential part of the brake control device according to the present invention;

DESCRIPTION OF THE PREFERRED EMBODIMENTS

Figure 2:
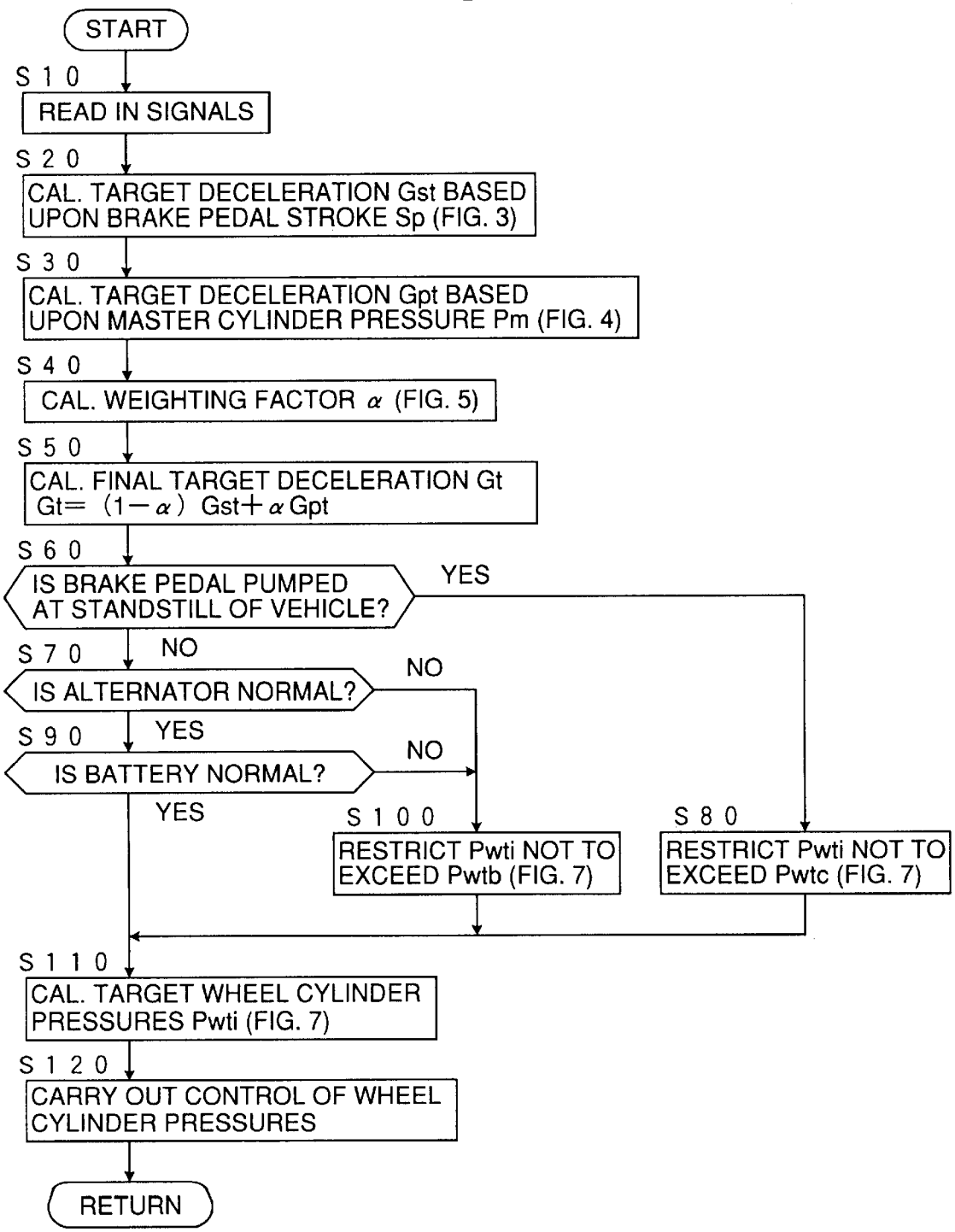
FIG. 2 is a flowchart showing an embodiment of the brake control device according to the present invention in the form of a series of functions thereof.

In the following, the present invention will be described in more detail with respect to a preferred embodiment thereof by referring to the accompanying drawings.

Referring to FIG. 1A, the hydraulic circuit totally designated by 10 of a brake system of a vehicle (not shown) and having pairs of front and rear wheels (not shown) comprises wheel cylinders 20FR, 20FL, 20RR and 20RL for applying braking forces to front right, front left, rear right and rear left ones of the wheels, respectively. The hydraulic circuit comprises a master cylinder 14 adapted to compress a brake fluid supplied from a reservoir 26 according to a depression of a brake pedal 12 by a driver, so as to deliver a pressurized brake fluid through passages 16 and 18 toward the wheel cylinders 20FL and 20FR, respectively. On-off valves 22FL and 22FR are provided in the passages 16 and 18, respectively, so as normally not to obstruct communication of the passages 16 and 18, while selectively interrupting the communication of the passages 16 and 18, respectively. Indeed, the on-off valves 22FL and 22FR are solenoid actuated valves which are maintained in a through open condition such as shown in the figure when no electric current is supplied thereto, while they are changed over to a position interrupting the communication of the passages 16 and 18, respectively, when they are supplied with an electric current when an ignition switch (not shown) is turned on.

Therefore, it will be appreciated that the shown hydraulic circuit is ready for braking the pair of front wheels simply hydraulically according to a depression of the brake pedal 12 when the ignition switch is not turned on or the electric power source of the vehicle has failed for any reason, while when the ignition switch is turned on with a sound battery condition, the on-off valves 22FR and 22RL are changed over to their closed position of interrupting the passages 16 and 18, so as to let the hydraulic circuit ready for operation with the brake fluid pressure source provided by a pump 34 under the control of electric control means described hereinbelow.

The pump 34 is adapted to be selectively driven by an electric motor 32 powered by the above-mentioned battery via control means described in detail hereinbelow, so as to pump up the brake fluid supplied from the reservoir 26 through a suction passage 28 for providing a pressurized source of the brake fluid in an outlet passage 29 branching to passages 36FR, 36FL, 36RR and 36RL for supplying the pressurized brake fluid to the wheel cylinders 20FR, 20FL, 20RR and 20RL through on-off valves 40FR, 40FL, 40RR and 40RL, respectively. An accumulator 31 may be connected to the outlet passage 29. The on-off valves 40FR, 40FL, 40RR and 40RL are each of a normally closed type which maintains each of the supply passages 36FR, 36FL, 36RR and 36RL in an interrupted condition when no electric current is supplied thereto, and is selectively opened by a supply of an actuating electric current thereto.

The wheel cylinders 20FR, 20FL, 20RR and 20RL are exhaustible through exhaust passages 38FR, 38FL, 38RR and 38RL including on-off valves 42FR, 42FL, 42RR and 42RL, respectively, toward an exhaust passage 30 leading to the reservoir 26. The on-off valves 42FR, 42FL, 42RR and 42RL are each also of a normally closed type which maintains each of the exhaust passages 38FR, 38FL, 38RR and 38RL in an interrupted condition when no electric current is supplied thereto, and is selectively opened by a supply of an actuating electric current.

The pressures of the brake fluid in the wheel cylinders 20FR, 20FL, 20RR and 20RL are detected by pressure sensors 44FR, 44FL, 44RR and 44RL, respectively. The pressure of the brake fluid compressed by the master cylinder 14 is detected by a pressure sensor 48. The pressure of the brake fluid in the outlet passage 29 is detected by a pressure sensor 50.

The changeover of each of the on-off valves 22FR and 22FL, the on-off valves 40FR-40RL and the on-off valves 42FR-42RL is controlled by electric control means 52 diagrammatically shown in FIG. 1B, or in more detail, by a microcomputer 54 thereof through a drive circuit 56. The microcomputer may be of a common type including a central processor unit (CPU), a read only memory (ROM), a random access memory (RAM), input and output port means and bilateral bus means interconnecting these elements, all not shown in detail in the figure.

The microcomputer 54 is supplied with signals of pressures Pwi (i=fr, fl, rr and rl) of the brake fluid in the corresponding wheel cylinders from the wheel cylinder pressure sensors 44FR-44RL, a signal of depression stroke Sp of the brake pedal 12 by a driver from a brake pedal stroke sensor 46, a signal of master cylinder pressure Pm of the brake fluid compressed by the master cylinder 14 from the master cylinder pressure sensor 48, a signal of the pressure of the brake fluid in the pump outlet passage 29 from the powered source pressure sensor 50, a signal of output voltage Vb of the battery (not shown) forming the electric power source of the vehicle from a battery voltage sensor 58, signals of wheel speeds Vwi (i=fr, fl, rr and rl) of the front right, front left, rear right and rear left wheels from wheel speed sensors 60FR–60RL, a signal of stop lamp switch (STSW) 62 for putting on and off the brake lamps (not shown) of the vehicle according to a depression of the brake pedal by the driver, and a signal of output voltage Va of an alternator (not shown) for charging the battery from an alternator voltage sensor 64, and carries out certain control calculations based upon the values of the parameters input by the signals from the sensors 44FR–44RL, 46, 48, 50, 58, 60FR–60RL and 64 for executing a braking operation via the drive circuit 56 according to the depression of the brake pedal 12 by the driver as described in detail hereinbelow, with checking if the driver is pumping the brake pedal when the vehicle is at a substantial standstill, and also checking if the alternator or the battery is operating in its normal condition. The checking of the battery may be executed according to a process such as described in the above-mentioned co-pending application No. (1231). When the driver is pumping the brake pedal when the vehicle is as a substantial standstill or when the alternator or the battery is not operating in its normal condition, particular processes are executed for caring the battery as described in detail hereinbelow.

Now, referring to FIGS. 2–7, the device for controlling the brake system according to the present invention will be described in detail with respect to an embodiment thereof in the form of its operation of controlling the brake system shown in FIGS. 1A and 1B.

Referring to FIG. 2, when the device is started for operation by a closure of the ignition switch (not shown), in step 10 signals such as shown in FIG. 1B are read in.

In steps 20–50, a target value of the deceleration to be effected in the vehicle by a depression of the brake pedal by the driver is calculated in a manner described in U.S. patent application Ser. No. 09/263,226 by two colleges of the present inventor.

Figure 3:
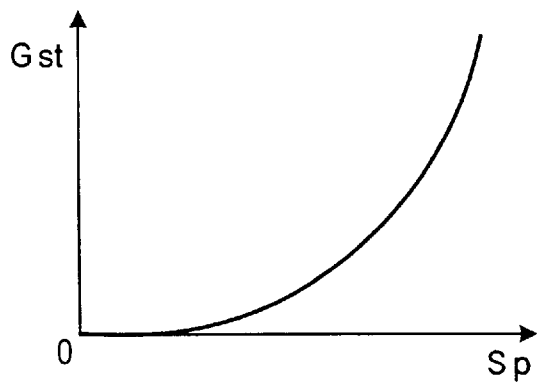
FIG. 3 is a graph showing an example of the performance of target deceleration Gst vs. brake pedal depression stroke Sp, i.e. a value of deceleration of the vehicle to be attained by the brake pedal being depressed to a corresponding depression stroke.

In more detail, in step 20, by looking up a map such as shown in FIG. 3 stored in the ROM of the microcomputer 54, a target deceleration Gst is read out against a current value of the depression stroke Sp of the brake pedal by the driver.

Figure 4:
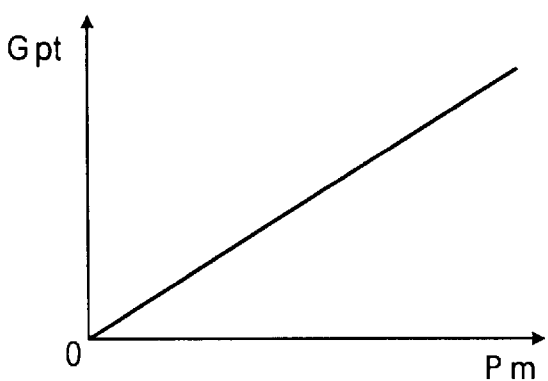
FIG. 4 is a graph showing an example of the performance of target deceleration Gpt vs. master cylinder pressure Pm, i.e. a value of deceleration of the vehicle to be attained by the brake pedal being depressed to generate a corresponding value of the master cylinder pressure.

In step 30, by looking up a map such as shown in FIG. 4 stored in the ROM, a target deceleration Gpt is read out against a current value of the master cylinder pressure Pm.

Figure 5:
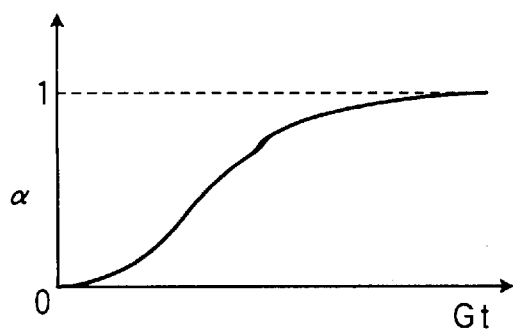
FIG. 5 is a graph showing an example of the performance of weighting factor α vs final target deceleration Gt, i.e. a factor for weighting the target deceleration Gpt dependent of the master cylinder pressure in determining the braking force to be applied to the wheels according to a weighted combination of the target decelerations Gpt and Gst.

In step 40, by looking up a map such as shown in FIG. 5 stored in the ROM, a weighting factor a for weighting the target deceleration Gpt based upon the master cylinder pressure Pm against the target deceleration Gst based upon the brake pedal depression stroke Sp is estimated against total target deceleration Gt which is a weighted sum of the target decelerations Gpt and Gst by the weighting factor a according to the following equation:

$$Gt=(1-\alpha)Gst+\alpha Gpt$$

In the brake control carried out according to the repetitive calculations of the steps of FIG. 2, the reading out of the weighting factor α by the map of FIG. 5 is executed based upon the value of Gt obtained by each previous cycle of the calculations through the flowchart of FIG. 2.

According to such a rightward rising slope shape of the curve of FIG. 5, the weighting of the parameters in the estimation of the deceleration of the vehicle to be targeted at is gradually shifted from a weighting on the brake pedal depression stroke to a weighting on the master cylinder pressure along with increase of the target deceleration, i.e. as a higher braking force is applied to the wheels.

Then in step 60, it is judged if the brake pedal is pumped by the driver when the vehicle is at a substantial standstill. This judgment is done according to such processes as shown by the flowchart of FIG. 6.

Figure 6:
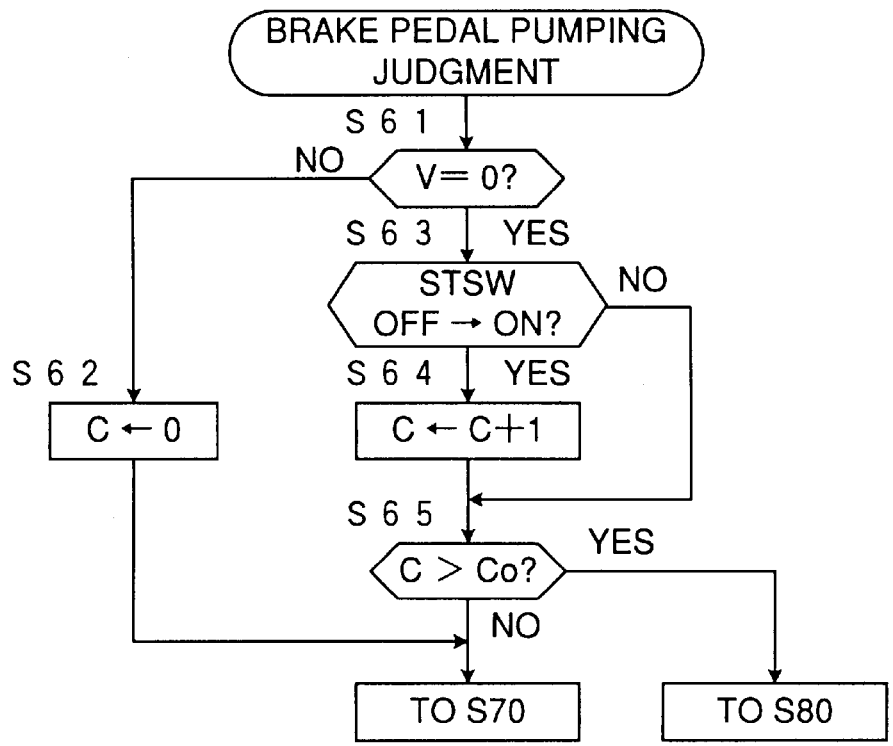
FIG. 6 is a flowchart showing processes executed as a subroutine control in step 60 of the flowchart of FIG. 2.

Referring temporarily to FIG. 6, in step 61 it is judged if the vehicle speed V is substantially zero. The vehicle speed V will be available from the signals of the wheel speed sensors 60FR–60RL. When the answer is no, the control proceeds to step 62, and count C of a counter (not shown) is reset to 0, and the control proceeds to step 70 of FIG. 2, while when the answer is yes, the control proceeds to step 63.

In step 63, it is judged if the stop lamp switch (STSW) 62 was changed over from OFF to ON. When the answer is yes, the control proceeds to step 64, and the count C of the counter is incremented by 1, and the control proceeds to step 65, whereas when the answer is no, the control bypasses step 64 and goes to step 65.

In step 65, it is judged if the count C is larger than a predetermined threshold count value Co which may be 2 or 3. When the answer is no, the control proceeds to step 70, whereas when the answer is yes, the control proceeds to step 80 of FIG. 2. Thus it will be appreciated that by the subroutine of FIG. 3 it is detected if the driver is pumping the brake pedal at a substantial standstill of the vehicle.

Returning to FIG. 2, in step 70 it is judged if the alternator (not shown) for charging the battery (not shown) of the vehicle is in its normal operating condition. This judgment will be available by checking the output voltage of the alternator relative to its rotation speed. When the answer is yes, the control proceeds to step 90, whereas when the answer is no, the control proceeds to step 100.

In step 90, it is judged if the battery of the vehicle is in its normal operating condition. As noted above, this judgment may be made as described in a co-pending application No. (1231). When the answer is yes, the control proceeds to step 110, whereas when the answer is no, the control proceeds to step 100.

Figure 7:
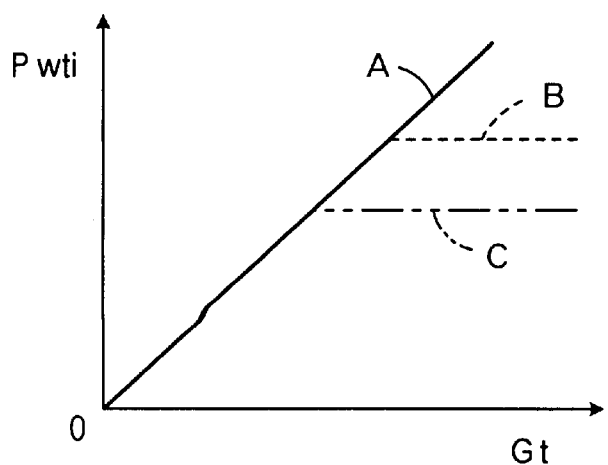
FIG. 7 is a graph showing an example of the performance of target wheel cylinder pressures Pwti vs. the final target deceleration Gt in which modifications are incorporated according to the present invention.

In step 110, target wheel cylinder pressures Pwti (i=fr, fl, rr, rl) to be attained in the respective wheels are calculated based upon the final target deceleration Gt, obtained in step 50 and other operating parameters such as steering angle, etc. not particularly shown by the figure. FIG. 7 shows an example of the relationship between Pwti and Gt, wherein a performance such as shown by a solid line A is followed with no restriction when the control has come to step 110 directly from step 90.

However, when the control comes to step 110 through step 80 or 100, the results of calculation of Pwti in step 110 are under the restriction imposed thereon in step 80 or 100. In more detail, in step 100, a restriction is imposed on the magnitude of Pwti such that none of Pwti higher than a pressure level Pwtb such as shown by a broken line B in FIG. 7 is available regardless of the results of calculation in step 50. Similarly, in step 80, a restriction is imposed on the magnitude of Pwti such that none of Pwti higher than a pressure level Pwtc such as shown by a dot-dash line C in FIG. 7 is available regardless of the results of calculation in step 50.

Therefore, it will be appreciated that when the driver is pumping the brake pedal when the vehicle is at a substantial standstill, the target values Pwti of the brake pressure to be attained in the wheel cylinders according to the depression of the brake pedal by the driver is temporarily suppressed not to be higher than the value C, so as to care the battery in a manner of saving a useless consumption of the battery.

On the other hand, when the battery has lost its normal operating condition, or it is anticipated that the battery will soon lose its normal operating condition due to an insufficient charging by the alternator which has lost its normal operating condition, as detected in step 90 or 70, respectively, the target pressure Pwti of the brake pressure to be attained in the wheel cylinders according to the depression of the brake pedal by the driver is temporarily suppressed not to be higher than the value C in FIG. 7, so as to care the battery in a manner of reducing the load imposed thereon.

In step 120, the supply of the brake fluid pressures to the respective wheel cylinders is carried out according to the target wheel cylinder pressures Pwti calculated in the manner described above.

Figure 8:
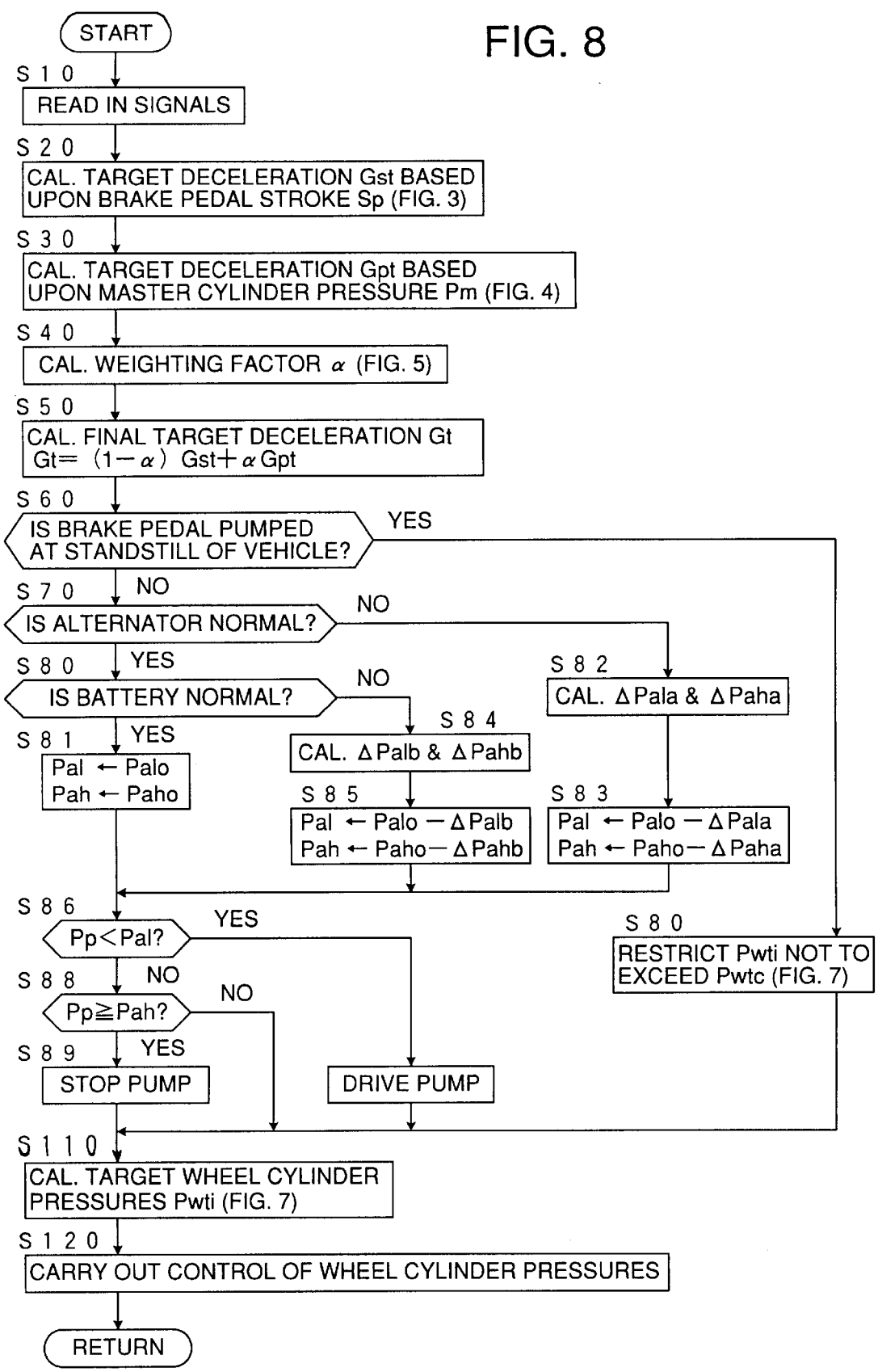
FIG. 8 is a flowchart similar to FIG. 2, showing a partial modification of the processes in the flowchart of FIG. 2.

FIG. 8 is a flowchart similar to that of FIG. 2, showing a modification of step 100 of FIG. 2. In the flowchart of FIG. 8, the steps corresponding to those shown in FIG. 2 are designated by the same step numbers as in FIG. 2. In this modification, the effect of imposing the restriction of the pressure level B on the target wheel cylinder pressures Pwti as shown in FIG. 7 is provided by lowering the pressure level maintained in the accumulator 31 shown in FIG. 1.

In more detail, when the answer of step 80 is yes, the control proceeds to step 81, and a lower pressure limit Pal of the accumulator pressure at which the pump is automatically put on to replenish the accumulator and a higher pressure limit Pah of the accumulator pressure at which the replenishment driving of the pump is stopped are reset to their normal pressure values Palo and Paho, respectively.

On the other hand, when the answer of step 70 is no, the control proceeds to step 82, and amounts ΔPala and ΔPaha for lowering the lower pressure limit Pal and the higher pressure limit Pah from the normal standard values Palo and Palh, respectively, are calculated as follows:

ΔPala=Kala|1−(Va/Vao)|Palo

ΔPaha=Kaha|1−(Va/Vao)|Paho wherein Vao is a standard output voltage of the alternator at its normal standard operating condition, Va is the output voltage of the alternator at the normal standard operating condition, and Kala and Kaha are appropriate factors.

Then in step 83, the values of the lower and higher pressure limits Palo and Paho are temporarily lowered as much as ΔPala and ΔPaha, respectively.

When the answer of step 80 is no, the control proceeds to step 84, and amounts ΔPalb and ΔPahb for lowering the lower pressure limit Pal and the higher pressure limit Pah from the normal standard values Palo and Palh, respectively, are calculated as follows:

ΔPala=Kalb|1−(Vb/Vbo)|Palo

ΔPaha=Kahb|1−(Vb/Vbo)|Paho wherein Vbo is a standard output voltage of the battery at its normal standard operating condition, Vb is the output voltage of the battery at the normal standard operating condition, and Kalb and Kahb are appropriate factors.

Then in step 85, the values of the lower and higher pressure limits Palo and Paho are temporarily lowered as much as ΔPalb and ΔPahb, respectively.

In step 86, it is judged if the brake fluid pressure Pp of the accumulator detected by the pressure sensor 50 is lower than the lower pressure limit Pal. When the answer is yes, the control proceeds to step 87, and the pump is driven by supplying an electric power to the motor 32 from the battery, and then the control proceeds to step 110. When the answer of step 86 is no, the control proceeds to step 86, and it is judged if the brake fluid pressure Pp is equal to or higher than the higher pressure limit Pah. When the answer is yes, the control proceeds to step 89, and the pump is stopped, whereas when the answer is no, the control proceeds to step 110.

Therefore, it will be appreciated that, according to this modification, the brake fluid pressure of the accumulator 31 which substantially forms the pressurized brake fluid source of the brake system is normally maintained between Palo and Paho, whereas when it was detected that the alternator or battery is not normally operating, the accumulator pressure is lowered to be maintained between Palo−ΔPala and Paho−ΔPaha, or Palo−ΔPalb and Paho−Δpahb, respectivekly, wherein the magnitudes of ΔPala and ΔPaha or ΔPalb and ΔPahb are determined according to the degree of lowering of the output voltage of the alternator or the battery so that the battery is cared according to the degree of anticipation of the battery to fail due to an insufficient charging or the degree of the actual failing of the battery.

Although the present invention has been described in detail with respect to a particular embodiment thereof and some modification, it will be apparent for those skilled in the art that various modifications are possible without departing from the scope of the present invention.

What is claimed is:

1. A device for controlling an electro-hydraulic brake system of a vehicle having wheels, a battery, an alternator for charging the battery, and the electro-hydraulic brake system adapted to be energized by the battery and including wheel cylinders, a brake pedal, electric control means, a pump adapted to operate under a control of the electric control means for pressurizing a brake fluid, and on-off valves adapted to operate under a control of the electric control means for selectively supplying the brake fluid pressurized by the pump to each of the wheel cylinders, the device comprising:

means for detecting if the battery is normally operating;

wherein the electric control means control the operation of the pump and the on-off valves such that the pressure of the brake fluid supplied to the wheel cylinders is restricted not to be higher than a first predetermined medium pressure value when the battery detection means detect that the battery is not normally operating.

2. A device according to claim 1, further comprising:

means for detecting if the alternator is normally operating;

wherein the electric control means control the operation of the pump and the on-off valves such that the pressure of the brake fluid supplied to the wheel cylinders is restricted not to be higher than a second predetermined medium pressure value when the alternator detection means detect that the alternator is not normally operating.

3. A device according to claim 1, further comprising:

means for detecting if the vehicle is substantially at a standstill; and means for detecting if the brake pedal is pumped by a driver;

wherein the electric control means control the operation of the pump and the on-off valves such that the pressure of the brake fluid supplied to the wheel cylinders is restricted not to be higher than a third predetermined medium pressure value when the brake pedal is pumped at a substantial standstill of the vehicle.

4. A device according to claim 2, further comprising:

means for detecting if the vehicle is substantially at a standstill; and means for detecting if the brake pedal is pumped by a driver;

wherein the electric control means control the operation of the pump and the on-off valves such that the pressure of the brake fluid supplied to the wheel cylinders is restricted not to be higher than a third predetermined medium pressure value when the brake pedal is pumped at a substantial standstill of the vehicle.

5. A device according to claim 3, wherein the third predetermined medium pressure value is lower than the first predetermined medium pressure value.

6. A device according to claim 4, wherein the third predetermined medium pressure value is lower than the first and second predetermined medium pressure values.

7. A device according to claim 1, wherein the brake system further comprises an accumulator for the brake fluid pressurized by the pump, and the electric control means control the operation of the pump such that the pressure of the brake fluid supplied to the wheel cylinders is restricted not to be higher than the first predetermined medium pressure value by lowering the pressure of charging the accumulator when the battery detection means detect that the battery is not normally operating.

8. A device according to claim 2, wherein the brake system further comprises an accumulator for the brake fluid pressurized by the pump, and the electric control means control the operation of the pump such that the pressure of the brake fluid supplied to the wheel cylinders is restricted not to be higher than the second predetermined medium pressure value by lowering the pressure of charging the accumulator when the alternator detection means detect that the alternator is not normally operating.

\* \* \* \* \*